United States Patent [19]

Hagenlocher et al.

[11] 4,155,023
[45] May 15, 1979

[54] BRUSH-HOLDER FOR DYNAMO ELECTRIC MACHINES, PARTICULARLY AUTOMOTIVE-TYPE THREE-PHASE ALTERNATORS

[75] Inventors: Walter Hagenlocher, Stuttgart; Karl Kleebaur, Allmersbach; Walter Eichenseer, Stuttgart; Jörg Streller, Affalterbach, all of Fed. Rep. of Germany

[73] Assignee: Robert Bosch GmbH, Stuttgart, Fed. Rep. of Germany

[21] Appl. No.: 707,321

[22] Filed: Jul. 21, 1976

[30] Foreign Application Priority Data

Aug. 13, 1975 [DE] Fed. Rep. of Germany ....... 2536018

[51] Int. Cl.² .................................. H02K 13/00
[52] U.S. Cl. .............................. 310/246; 310/51
[58] Field of Search ............... 310/246, 239, 241, 242, 310/232, 244, 245, 247, 229, 219, 248, 51, 68 D; 318/439, 361, 541

[56] References Cited

U.S. PATENT DOCUMENTS

| | | | |
|---|---|---|---|
| 1,604,898 | 10/1926 | Fynn | 310/241 |
| 1,798,394 | 3/1931 | Angus | 310/244 |
| 2,262,409 | 11/1941 | Schuck | 310/244 |
| 2,498,346 | 2/1950 | Smith | 310/244 |
| 2,548,307 | 4/1951 | Hall | 310/232 |
| 3,234,420 | 2/1966 | Lindner | 310/244 |
| 3,254,249 | 5/1966 | Pfeifer | 310/244 |
| 3,453,513 | 7/1969 | Bates | 318/439 |
| 3,482,135 | 12/1969 | Hurlin | 310/239 |
| 3,553,504 | 1/1971 | Balke | 310/68 D |
| 3,824,416 | 7/1974 | van de Griend | 310/51 |
| 3,867,679 | 2/1975 | Smith | 318/361 |

FOREIGN PATENT DOCUMENTS 692351 7/1965 Italy ......................... 310/244

*Primary Examiner*—R. Skudy
*Attorney, Agent, or Firm*—Flynn & Frishauf

[57] ABSTRACT

To provide an inexpensive assembly of a brush-holder and brush to engage the slip rings of an automotive-type alternator, particularly for low-cost, high-quantity mass production, a brush carrier arm, for example of leaf spring or circular spring material, is directly connected to hold a brush at one end thereof, for example by clamping the brush, securing it in a socket, or carrying an insulated brush-holder plate to which the brushes themselves are attached, the brush-holder arm being secured to a base which may be integral with, or form the cover of a housing for an electronic voltage regulator, so that the brush-holder itself will provide the spring engagement force for reliable electrical contact while permitting functioning also as an electrical connection and permitting inexpensive manufacture.

31 Claims, 16 Drawing Figures

BRUSH-HOLDER FOR DYNAMO ELECTRIC MACHINES, PARTICULARLY AUTOMOTIVE-TYPE THREE-PHASE ALTERNATORS

The present invention relates to a brush-holder for dynamo electric machines, and more particularly to a brush-holder to engage the slip rings of an automotive-type alternator to supply current to a rotating, excited field.

Dynamo electric machines, and particularly machines having excited fields or rotating parts which require power supply or take up power, require a brush arrangement to provide contact between the rotating and stationary portions of the machine. The brush arrangements forms a critical part. The brushes must provide good electrical contact between the rotor and stator while, additionally, the brushes must retain their relative position with respect to the rotary part in spite of vibration and dynamic operating conditions. This is particularly true for alternators, such as three-phase alternators used in automotive applications in which road shocks and other changes in ambient conditions further affect the quality of contact between the stationary part of the machine and the rotor. It is important to hold the brush in a relatively fixed position with respect to the commutator or slip rings which form current transfer element regardless of rapidly changing ambient operating conditions. The brush must be retained not only in its position, but also under at least some slight pressure in order to effect the necessary cooperation and to provide for the electrical contact between brush and commutator, or slip ring. In order to ensure reliable contact, it is therefore customary to pay particular attention to the holding arrangements for the brushes. This results in relatively complicated and costly constructions.

Brush and brush-holder assemblies have been proposed for automotive-type alternators in which a carrier arm is used which is bent several times over several angles and attached at one of its ends to a stationary portion of the machine; the other end is secured to a brush. The carrier arm is made of springy material, and the brush is attached to the material by means of a conductive, adhesive paste. This brush and holder assembly is, however, not well suited to mass production in large quantities due to its relatively complicated shape.

It is an object of the present invention to provide a brush holder for dynamo electric machines, and more particularly a brush holder which can readily be combined with a brush which is simple to make, lends itself to mass production manufacture and is effective in use regardless of changes in ambient operating conditions, that is, under shock, vibration, and wide temperature swings, while being simple to install and assemble, inexpensive, and reliable in use over a long period of time.

SUBJECT MATTER OF THE PRESENT INVENTION

Briefly, a brush carrier arm is provided made of springy material, to which at least one brush is directly secured at one end thereof. The other end of the carrier arm is secured to a fixed machine part, for example to a base. If the machine is an automotive type alternator, the cover or base of the voltage regulator, for example an electronic voltage regulator and usually used in automotive applications may form the mixed part. The carrier arm forms simultaneously the holding support for the brush and additionally provides for spring force of application of the brush against the rotating current transfer element, such as a slip ring or commutator of the machine.

In accordance with a feature of the invention, the brush arm is made of a strip spring material, or of spring wire to which the brush itself is secured by adhesion, clamping, or setting, for example in a socket secured to or formed at the end of the arm. Two arms may be used, positioned diametrically with respect to the machine, or adjacent each other to engage adjacently located slip rings.

The invention will be described by way of example with reference to the accompanying drawings, wherein:

FIG. 2b is a part sectional, part side view taken along lines IIB—IIB of FIG. 2a;

Figure 1:
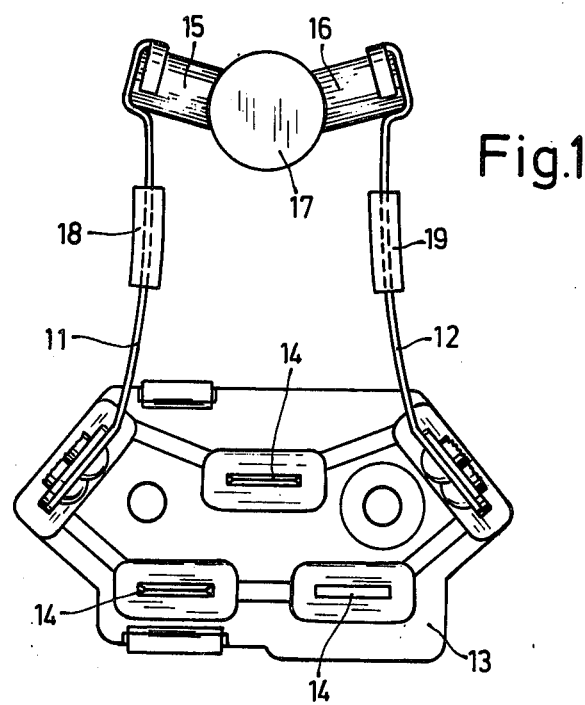
FIG. 1 is a schematic elevational end view of the brush-holders, assembled to a holding plate of a dynamo electric machine and engaging slip rings attached to the rotor thereof.
Figure 4:
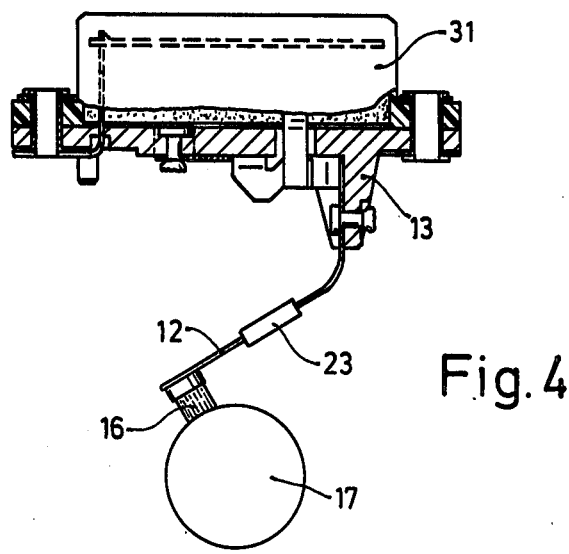
Figure 5A:
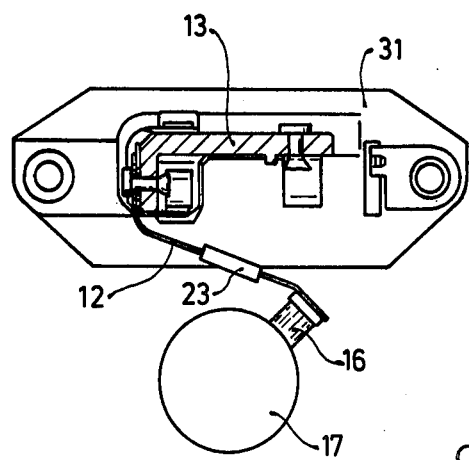
Figure 5B:
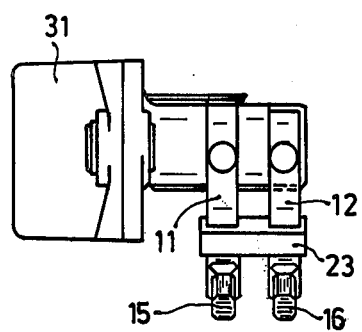

FIG. 3, in views a to k, shows various embodiments of the brush-holders, and specifically: view a is a top view of a strip brush-holder; view b is a schematic top view of wire-type brush-holder; view c is a schematic top view of a pair of wire brush holders; view d is a schematic top of another embodiment of a pair of brush holders; view e is a side view of a brush-holder and one form of attachment arrangement of a brush; view f is a top view of a brush and brush-holder attachment arrangement; views g and g' are top views of another embodiment of a brush-holder, in which view g shows the brush-holder gripping a bush and view g' shows the brush-holder blank before being deformed to grip the brush; view h is a side view of a brush-holder and socket to hold a brush; views i and i' are, respectively, a top view and sectional side view of yet another embodiment of the invention using one support arm; and view k is a top view of another embodiment of a single support arm brush-holder;

FIG. 4 is a schematic side view, partly in section, of a brush-holder and arm similar to the embodiment of FIG. 1, combined with a voltage regulator, in which the voltage regulator is transversely arranged with respect to the alternator; and FIGS. 5a and 5b are front views and end views, respectively, of another embodiment of a brush-holder and voltage regulator combination.

Leaf springs 11, 12 (FIG. 1) are secured to a common base or support plate 13. Connectings lugs or flags 14 are electrically connected to the brush-holders and secured to plate 13 for outside circuit connections. Carbon brushes 15, 16 are secured to leaf springs 11, 12, the carbon brushes being pressed by the spring force of the leaf springs 11, 12 against slip ring assembly 17, forming the rotor current transfer element secured to the shaft of a dynamo electric machine, not separately shown. Aproximately midway of the length of the brush-holder arms 11, 12, damping elements 18, 19 are secured to the leaf springs. These damping elements may, for example, be sleeves, strips, or coatings of plastic material. Preferably, leaf springs 11, 12 have the plastic material injection molded therearound; the plastic material may also be sprayed on separately, completely surrounding the leaf spring (see also FIG. 2b). FIG. 1 illustrates the brushes engaging the slip ring assembly 17 when the brushes are new. As the brushes wear, the springs 11, 12 will approach the slip ring assembly 17, since the length of the respective brushes 15, 16 will decrease.

Leaf springs 11, 12 are carrier arms which secure brushes 15, 16 mechanically and simultaneously serve as current conductors for the brushes 15, 16. The brushes 15, 16 mechanically and electrically engage the slip ring assembly 17 in slipping contact arrangement.

The damping elements 18, 19 are preferably about 1/3 as long as the spring, or springs to which they are attached.

Figure 2B:
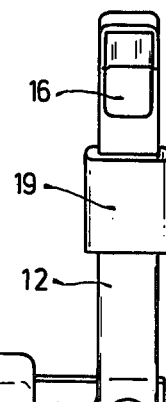
Figure 2A:
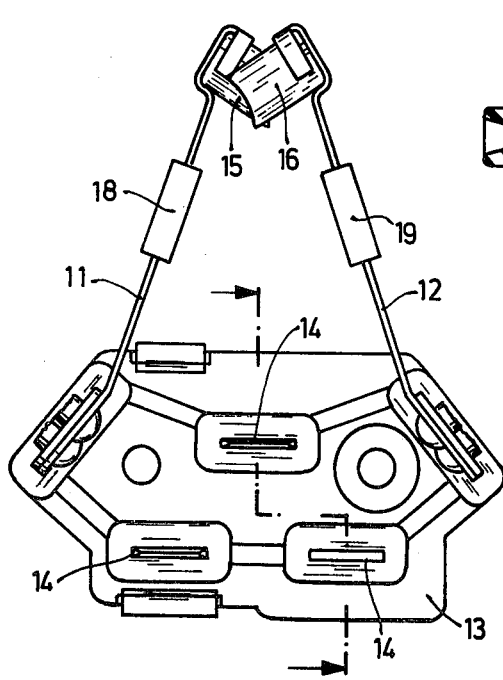
FIG. 2a is a view similar to FIG. 1, showing the brush-holder assembly before the brushes engage the respective slip rings.
Figure 3A:
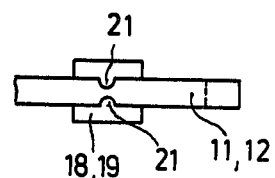
Figure 3F:
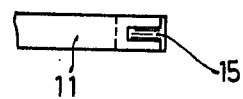
Figure 3B:
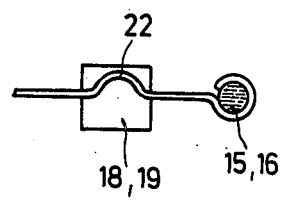
Figure 3G:
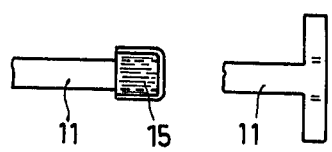
Figure 3C:
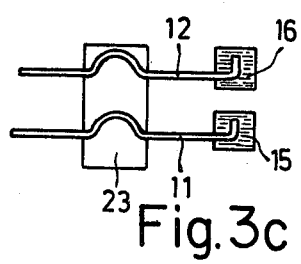
Figure 3H:
Figure 3D:
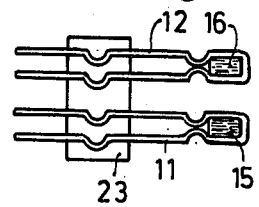
Figure 3I:
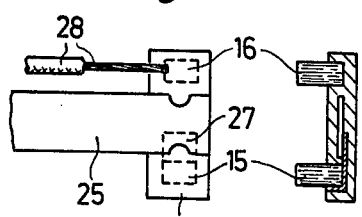
Figure 3E:
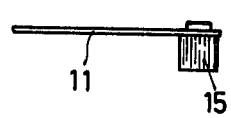
Figure 3K:
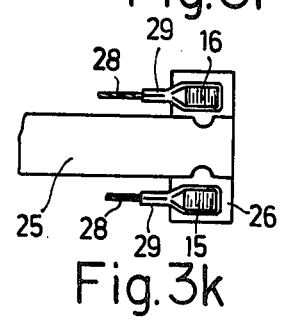

Upon manufacture, the brush-holder will look as illustrated in FIGS. 2a, 2b; the leaf springs 11, 12 are not stressed and essentially straight. The brushes 15, 16 are generally adjacent each other, one brush being located in overlapping relationship next to the other. To assemble the brush-holder, it is merely necessary to bend the leaf springs 11, 12 backwardly, so that they can snap against the slip rings of the slip ring assembly 17.

The brushes 15, 16 can be secured to the holding arms in various ways, and the holding arms themselves may have different shapes. Referring now to FIG. 3 which, collectively, in various views shows various embodiments: View a illustrates how the damping plastic 18, 19 is held on leaf springs 11, 12; in this embodiment, the leaf spring is formed with a notch 21; the notch is located approximately in the middle of the leaf spring, and entirely surrounded by the respective damping element. The notches prevent slipping of the damping elements 18, 19 longitudinally of the respective leaf spring 11, 12. If the carrier arm is not a leaf spring, but rather a wire-type spring of, for example, circular cross section, the springy carrier arm 11' of 12', respectively, is formed with a bulge halfway along its length, around which the plastic damping material 18, 19 is positioned. Round wire stock is an excellent material to hold the brushes 15', 16' which, as shown, are rounded at the end. The brush-holder wire is bent around the round brush 15', 16' to secure clamp and hold the brush in position.

The brush-holder arms can be individually placed or secured together and damped together by a common element; views c, d, i and k show arrangements in which the carrier arms and hence the sliding contacts are located in parallel. The assembly of such a carrier arm-brush combination is shown in FIG. 4. A single damping element 23, 23' (FIG. 3—views c and d) can then be used, rather than separate damping elements, which facilitates mass production. In the embodiment according to FIG. 3, view c, the brushes 15c, 16c have lateral openings formed therein into which the carrier arms 11c, 12c, respectively, are inserted. A common damping element surrounds both arms 11c, 12c, which arms are formed with a bulge similar to the arm of view b. In the embodiment shown in view d, the brush-holder arms 11d, 12d are formed as wire loops; the wire loops are deformed and loop around the respective ends of the brushes 15d, 16d, clamping or pinching the brushes. A common damping element 23d is used, surrounding the wire loops 11d, 12d approximately midway of their length. The open ends of the wire loops are clamped to plate 13 (FIG. 1).

The brush 15e (FIG. 3— view e) is sintered on, or secured to carrier arm 11e by resistance-soldering. The carrier arm 11f, as shown in view f, has a notch placed at the outer end fitting into a matching notch of the brush 15e. The fit is then secured by an adhesive or by soldering. FIG. 3, view g, shows a leaf spring 11g against which a brush 15g is placed. As seen in view g', the end of the leaf spring is T-shaped and, after placement of the brush 15e in position as shown in dotted lines in view g', the cross portion of the T is bent over and around the brush to clamp the brush and hold it in position. The brush 15h may also be formed with an end socket 24, as seen in FIG. 3, view h, the socket being welded to the springy carrier arm 11h.

FIG. 3, views i and k show embodiments in which only a single leaf spring 25 is used as a carrier arm, and a cross element 26 of insulating material is secured to the leaf spring. The brushes 15i, 16i and 15k, 16k, respectively, are fitted into and secured to the cross element 26. The single leaf spring 25 can be arranged and placed with respect to the brush to form one terminal of the current supply, as shown in FIG. 3, view i. The cross piece 26 has a small conductive strip 27, or a conductive portion attached thereto to form the electrical connection between the single leaf spring 25 and brush 15i. Brush 16i is electrically connected by means of a pigtail wire 28. In the embodiment of FIG. 3, view k, the cross piece 26 only serves as a holder for the respective brushes 15k, 16k, both brushes being connected electrically by pigtail wires 28k. The pigtail wires may be solder-connected, as illustrated in the embodiment of view i of FIG. 3, or can be press-fitted in terminal loops 29 surrounding the brushes 15k, 16k, as illustrated in FIG. 3, view k. Preferably, the pigtail wires 28 are also soldered to the connectors 29.

FIGS. 4 and 5 illustrate the combination of brush-holders in accordance with the present invention with a voltage regulator 31. The voltage regulator 31, as shown in FIG. 4, is arranged for radial assembly in a dynamo electric machine. The voltage regulator 31' of FIGS. 5a, 5b is arranged for axial assembly in a machine, as is particularly apparent when considering FIG. 5b. The voltage regulators themselves, as well as their circuits are well known and may be of any suitable construction, with electronic or mechanical control, preferably electronic. The carrier plate 13 to which the brush-holder arms themselves are attached preferably forms one of the closing plates or cover plates for the housing of the voltage regulator 31, or 31', respectively.

FIG. 5b also shows that the arrangement of side-by-side carrier arms 11b, 12b may use flat strip carrier arms similar to those illustrated in FIG. 3, view a, while using a common damping element 23b. The attachment of the brushes to the carrier arms may take any one of the forms illustrated in connection with various views of collective FIG. 3.

Various changes and modifications may be made and features described in connection with any one of the embodiments may be used with any of the others, within the scope of the inventive concept.

We claim:

1. Brush-holder for dynamo electric machines having a current transfer element (17) and brushes (15, 16) contacting said current transfer element, said brush holder comprising at least one elongated brush carrier arm (11, 12) of springy material, each arm including a pair of elongated, parallel spring elements;

at least one brush (15, 16) retained between the individual spring elements of a respective carrier arm adjacent one end thereof, the other end of the carrier arm being rigidly secured to the dynamo electric machine, so that the carrier arm forms the holding support for the brush and to provide spring force of application of the brush against the rotating current transfer element (17) of the machine;

and at least one damping element (18, 19; 23) located at a portion of the brush carrier arm intermediate said ends and spaced therefrom and surrounding said spring elements at least in part.

2. Brush-holder according to claim 1, wherein the brushes (15, 16) are carbon brushes.

3. Brush-holder according to claim 1, further comprising a support plate (13), and wherein two carrier arms (11, 12) are provided, located adjacent each other, the spring force of the carrier arms being directed in parallel towards the current transfer element (17) (FIG. 3, views c, d; FIGS. 4, 5).

4. Brush-holder according to claim 1, further comprising a support plate (13) and wherein two carrier arms (11, 12) are provided located, with respect to said transfer element (17), at opposite sides thereof, the spring forces of the carrier arms being directed towards each other to apply spring pressure of the brushes in diametrically opposite directions against the transfer element (17) (FIGS. 1, 2).

5. Brush-holder according to claim 1, wherein said at least one damping element (18, 19; 23) totally surrounds at least a portion of said at least one carrier arm.

6. Brush-holder according to claim 5, wherein the damping element extends along the length of the carrier element for about one-third of the total length thereof.

7. Brush-holder according to claim 5, wherein said damping element is located approximately midway along the length of the carrier arm.

8. Brush-holder according to claim 1, wherein said springs elements comprise spring wire.

9. Brush-holder according to claim 1, wherein said at least one carrier arm comprises a leaf spring.

10. Brush-holder according to claim 6, wherein aid carrier arm comprises a leaf spring element (25) electrically connected to one of the brushes, and the separate flexible electrical supply connection (28) is secured to the other of the brushes (16).

11. Brush-holder according to claim 6, wherein said carrier arm comprises a leaf spring element (25k), and the separate electrical connection means (28k) are electrically separately connected to all said brushes (15k, 16k).

12. Brush-holder according to claim 1, further comprising a surface deformation (21, 22) located at said intermediate portion of the said at least one carrier arm;

and said damping element forms damping material (18, 19) surrounding said carrier arm in the region of said deformation, the deformation retaining said damping material in position on the carrier arm.

13. Brush-holder according to claim 12, wherein said deformation is formed as a groove or notch in the carrier arm.

14. Brush-holder according to claim 1, wherein the brush (15, 16) is secured to the respective end of the carrier arm by deformation and clamping of the carrier arm, the carrier arm being shaped to surround at least a portion of the brush to clamp the brush within the surrounding portion thereof.

15. Brush-holder according to claim 1, wherein the brush and the carrier arm are, respectively, formed with an interengaging insertion connection to secure the brush to the carrier arm.

16. Brush-holder according to claim 1, wherein the respective brush and carrier arm are connected by sintering the carrier arm and brush together.

17. Brush-holder according to claim 1, wherein the brush is soldered to the carrier arm.

18. Brush-holder according to claim 1, wherein the carrier arm is formed with a groove or notch, and the respective brush is secured in the groove or notch to provide for a reliable mechanical and electrical connection of brush and carrier arm.

19. Brush-holder according to claim 1, further comprising a socket (24) mechanically and electrically connected to the carrier arm, the socket being shaped to fit around the brush and retaining said brush in clamped relationship.

20. Brush-holder according to claim 1, further comprising a base plate (13), said other end of said at least one carrier arm being rigidly secured to said base plate, said base plate being radially arranged with respect to the rotating current transfer element of the machine.

21. Brush-holder according to claim 1, further comprising a base plate (13), said other end of said at least one carrier arm being rigidly secured to said base plate, said base plate being axially arranged with respect to the rotating current transfer element of the machine.

22. Brush-holder according to claim 1, further comprising a base plate (13), said other end of said at least one carrier arm being rigidly secured to said base plate, and contact flags (14) for connection fo said carrier arm to an electrical voltage regulator circuit secured to said base plate.

23. Brush-holder according to claim 1, to hold field supply brushes of an automotive alternator-voltage regulator assembly, in combination with a voltage regulator (31), and further comprising a base plate (13), said other end of said carrier arm being rigidly secured to said base plate; said base plate further supporting electrical connection means, said base plate forming a portion of the voltage regulator (31).

24. Brush-holder according to claim 1, to hold field supply brushes of an automotive alternator-voltage regulator assembly, in combination with a voltage regulator (31), and further comprising a base plate (13), said other end of said carrier arm being rigidly secured to said base plate;

said voltage regulator having a housing cover, the base plate (13) and the housing forming a single integral molded unit.

25. The brush-holder-voltage regulator combination of claim 23 wherein two carrier arms (11, 12) are provided;

and said damping element forms a common damping element (23) surrounding, at least in part, both said carrier arms (11c, 12c, 11d, 12d).

26. Brush-holder for dynamo electric machines having a current transfer element (17) and brushes (15, 16) contacting said current transfer element, said brush-holder comprising at least two elongatd brush carrier arms (11, 12) of springy material, located essentially parallel to and insulated from each other;

one bursh (15, 16), each, directly secured to a respective carrier arm adjacent one end thereof, the other ends of the respective carrier arms being rigidly secured, insulated from each other, to the dynamo electric machine, so that the respective carrier arms form the holding support for the respective brushes to provide spring force of application of the brushes against the current transfer element (17) of the machine;

and a common damping element (23) of insulating material surrounding at least in part said two carrier arms and located at a portion of the carrier arms intermediate said ends and spaced therefrom to provide a damping effect intermediate the length of the elongatd carrier arms while maintaining said at least two carrier arms in spaced, insulated relation with respect to each other.

27. Brush-holder according to claim 26, wherein the damping element extends along the length of the carrier arms for about one-third of the total length thereof.

28. Brush-holder according to claim 26, wherein said carrier arms comprise spring wire.

29. Brush-holder according to claim 26, further comprising a surface deformation (21, 22) located along the length of said carrier arms;

said damping element including damping material surrounding said carrier arms in the region of said deformation, the deformation retaining said damping material in position on the carrier arms.

30. Brush-holder according to claim 26, to hold field supply brushes for a automotive alternator-voltage regulator assembly, in combination with the voltage regulator (31), and further comprising a base plate (13) supporting said carrier arms and comprising electrical connection means, said base plate forming a portion of the housing of the voltage regulator (31).

31. Brush-holder for dynamo electric machines having a current transfer element and brushes contacting said current transfer element, said brush-holder comprising a single carrier arm of springy material;

a brush-holder plate of insulating material located adjacent one end thereof, said brushes being secured to said brush holder plate;

the other end of the carrier arm being rigidly secured to the dynamo electric machine so that the carrier arm forms the holding support for the brushes and to provide spring force of application of the brushes against the rotating current transfer element of the machine;

a damping element located at a portion of said brush carrier arm intermediate the ends thereof and spaced therefrom, and surrounding, at least in part, said brush carrier arm;

and separate flexible supply connection means electrically connected and secured to at least one of said brushes.

* * * * *